United States Patent [19]

Takahashi

[11] Patent Number: 4,698,977
[45] Date of Patent: Oct. 13, 1987

[54] AIR CONDITIONING SYSTEM FOR AUTOMOTIVE VEHICLES

[75] Inventor: Tadahiro Takahashi, Konan, Japan

[73] Assignee: Diesel Kiki Co., Ltd., Tokyo, Japan

[21] Appl. No.: 796,413

[22] Filed: Nov. 8, 1985

[30] Foreign Application Priority Data

Nov. 12, 1984 [JP] Japan .............................. 59-170327[U]

[51] Int. Cl.⁴ .......................... B60H 1/32; F25B 1/00
[52] U.S. Cl. ...................................... 62/133; 62/161;
62/228.5; 62/243
[58] Field of Search ...................... 62/133, 180, 228.1,
62/228.4, 228.5, 226, 215, 243, 244, 510, 196.2,
161; 98/2.11, 2.01; 165/42, 43, 44, 16; 236/1
EA

[56] References Cited

U.S. PATENT DOCUMENTS 4,257,238  3/1981  Kountz et al. ................. 62/228.1 X
4,487,029  12/1984 Hidaka et al. ........................ 62/133
4,488,411  12/1984 Hara .............................. 62/228.5 X
4,507,932  4/1985  Suzuki et al. ......................... 62/180
4,510,764  4/1985  Suzuki ................................. 62/133

FOREIGN PATENT DOCUMENTS 0053339  4/1977  Japan ................................. 62/228.1
57-54411 11/1982 Japan .
58-28892  6/1983 Japan .

Primary Examiner—Harry Tanner
Attorney, Agent, or Firm—Frishauf, Holtz, Goodman & Woodward

[57] ABSTRACT

An air conditioning system for automotive vehicles equipped with a control device capable of controlling to different values a setting temperature above which a compressor should operate or a discharge capacity of same in response to an operating position of the blower manually set by a manually operable airflow rate setting switch. Further, the control device is capable of controlling the setting temperature or the discharge capacity in response also to load conditions of the engine of the vehicle. Furthermore, if the blower is in a high rate operating position, the setting temperature or the discharge capacity is controlled to such a value that enables the compressor to achieve sufficient cooling capacity, regardless of the position of the economy switch.

4 Claims, 6 Drawing Figures

AIR CONDITIONING SYSTEM FOR AUTOMOTIVE VEHICLES

BACKGROUND OF THE INVENTION

This invention relates to an air conditioning system for automotive vehicles, and more particularly to control of a compressor of an air conditioning system of this kind.

Conventional air conditioning systems for automotive vehicles are generally provided with an airflow rate setting switch for setting the flow rate of air discharged from a blower, and a thermostat responsive to temperature of an air outlet of an evaporator for closing or opening to operate or interrupt a compressor. However, the airflow rate setting switch and the thermostat are disposed so as to operate independently of each other. As a result, if the airflow rate setting switch is set to a large airflow rate position in order to obtain a sufficient cooling effect, it is impossible to achieve a desired cooling effect if the setting temperature of the thermostat is relatively high. Also in conventional air conditioning systems for automotive vehicles, which is equipped with a variable delivery compressor, the discharge capacity of the compressor is not always controlled to a sufficiently large value when the airflow rate setting switch is set to a large airflow rate position, thus failing to obtain a desired cooling effect.

Furthermore, if the thermostat is a type having a single setting temperature, the compressor can operate or driven by the engine even when the engine on the vehicle is in a high speed operating condition or in a high load operating condition such as acceleration or running up an ascending slope, where all the engine output should be applied for driving the vehicle. That is, on such an occasion, the engine output becomes insufficient, resulting in degraded driveability.

An air conditioning system for automotive vehicles, equipped with a compressor driven by an engine on the vehicle and disposed to be automatically turned on and off at a setting temperature, or equipped with a variable delivery compressor, has been proposed, e.g. by Japanese Provisional Utility Model Publication No. 57-54411 and Japanese Provisional Utility Model Publication No. 58-28892, which is provided with an economy switch for selectively switching the operation mode of the air conditioning system between normal mode and economy mode, an airflow rate setting switch for setting the airflow rate of the blower, a temperature sensor for detecting temperature at the discharge air outlet of the evaporator, and control means responsive to an output signal from the temperature sensor for effecting on-off control of the compressor in such a manner as to increase the operation rate of the compressor when the economy switch is turned to the normal mode position and to decrease the operation rate of the compressor when the economy switch is turned to the economy mode position.

According to the air conditioning systems of this kind, generally the airflow rate setting switch is turned to a large airflow rate position when the maximum cooling capacity (or maximum heating capacity) is required. However, with the conventional air conditioning system described above, when the economy switch is turned to the economy mode position, the setting temperature of a thermostat, which is an on-off changeover temperature setter, is set to a relatively high value to reduce the operation rate of the compressor. Therefore it is impossible to obtain the maximum cooling capacity so long as the economy switch is held at the normal mode position, even if the airflow rate setting switch is turned to the large airflow rate position.

SUMMARY OF THE INVENTION

It is an object of the invention to provide an air conditioning system for automotive vehicles, which is capable of controlling the compressor in such a manner that a desired cooling capacity and a desired driveability are obtained in response to the flow rate of air supply from the blower.

The present invention provides an air conditioning system for an automotive vehicle having an engine installed thereon, comprising: a compresor driven by the engine of the vehicle; a blower; varying means for varying one of a setting temperature above which the compressor should operate and a discharge capacity of same; airflow rate setting means including a manually operable airflow rate setting switch for selectively setting the blower at least to a first operating position for supplying air at a larger flow rate, and to a second operating position for supplying air at a smaller flow rate; and control means responsive to an operating position of the blower set by the manually operable airflow rate setting switch for controlling the varying means.

The control means is adapted to cause the varying means to set the setting temperature for the compressor to a lower value or set the discharge capacity of the compressor to a larger value when the blower is in the first operating position, and to cause the varying means to set the setting temperature to a higher value or set the discharge capacity to a smaller value when the blower is in the second operating position.

Further, sensor means is provided to sense load conditions of the engine. The control means is responsive to output of the sensor means to cause the varying means to set the compressor setting temperature to a higher value or set the compressor discharge capacity to a smaller value when the engine is in a predetermined high load condition, and to cause the varying means to set the compressor setting temperature to a lower value or set the compressor discharge capacity to a larger value when the engine is in a condition other than the predetermined high load condition.

Moreover, economy switch switch means is provided, which is adapted to be selectively set to a normal mode position where one of the compressor setting temperature and the compressor discharge capacity is set to a respective first predetermined value, and to an economy mode position where the one of the compressor setting temperature and the compressor discharge capacity is set to a respective second predetermined value. The control means is responsive to both a set operating position of the blower and a set mode position of the economy switch means, for controlling the varying means. To be specific, when the economy switch means is in the normal mode position, the control means causes the varying means to set the compressor setting temperature to a lower value or set the compressor discharge capacity to a larger value when the airflow rate setting means assumes either of the first operating position and the second operating position, while when the economy switch means is in the economy mode position, the control means causes the varying means to set the setting temperature to a lower value or set the discharge capacity to a larger value when the airflow rate setting means assumes the first operating position, and to set the setting temperature to a higher value or set the discharge capacity to a smaller value when the airflow rate setting means assumes the second operating position.

The above and other objects, features and advantages of the invention will be more apparent from the ensuing detailed description taken in conjunction with the accompanying drawings.

DETAILED DESCRIPTION

The invention will now be described with reference to the drawings showing several embodiments thereof.

Figure 1:
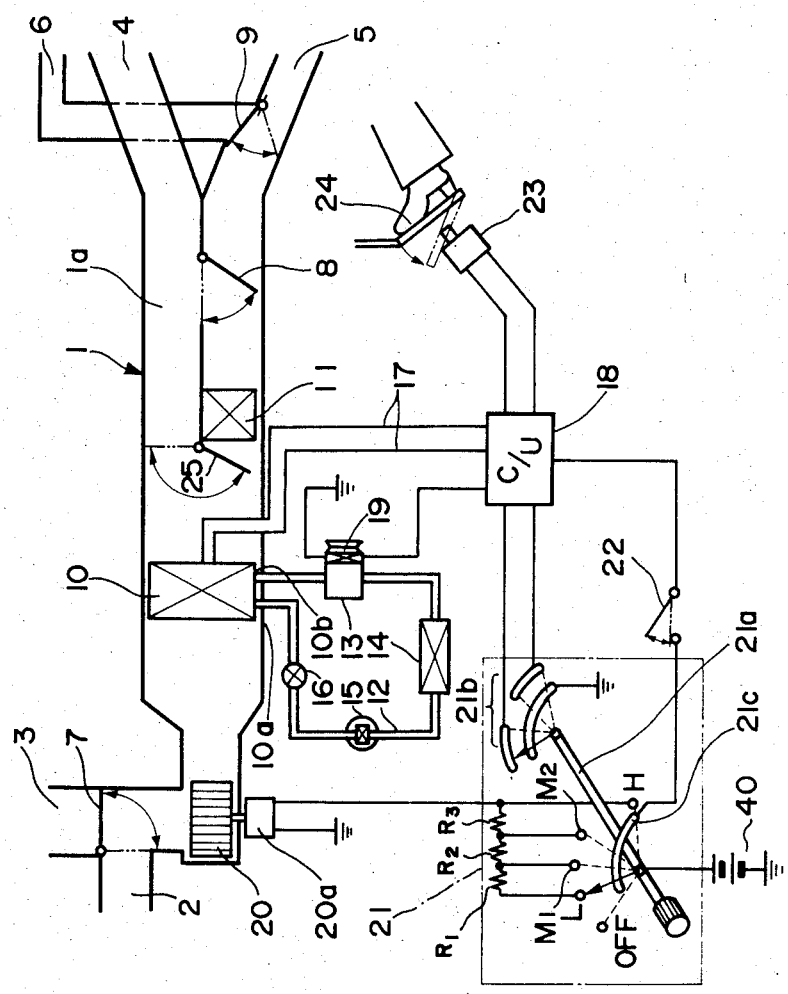
FIG. 1 is a schematic view illustrating an air conditioning system according to a first embodiment of the invention.

Referring first to FIG. 1, an embodiment of the invention will be described. FIG. 1 schematically illustrates the arrangement of an air conditioning system for automotive vehicles according to the invention, wherein reference numeral 1 designates a duct which has a recirculated air inlet 2 and a fresh air inlet 3 at its upstream end, and an upper air outlet 4, a lower air outlet 5 and a defroster air outlet 6 at its downstream end. Arranged in the duct 1 are a first selector damper 7 disposed to selectively assume a recirculated air intaking position or a fresh air intaking position, a second selector damper 8 disposed to selectively assume an upper discharge position or a lower discharge position, and a third selector damper 9 disposed to selectively assume the lower discharge position or a defroster discharge position. Also, provided at an axially intermediate location in the duct 1 are an evaporator 10 and a heater core 11, the latter being downstream of the former. A compressor 13, a condenser 14, a liquid receiver 15, and an expansion valve 16 are arranged across a conduit 12 connected between a refrigerant inlet port 10a and a refrigerant outlet port 10b of the evaporator 10. The discharge temperature of the evaporator 10 is detected by a temperature sensor (not shown) provided in an outlet of the evaporator and is inputted to an electronic control unit 18 via signal lines 17. The compressor 13 is connected to an output shaft of an engine (not shown) installed on a vehicle (not shown) via an electromagnetic clutch 19. The electromagnetic clutch 19 is electrically connected to the electronic control unit 18 and is controlled to turn on or off by a control signal from the control unit 18. Provided in the duct 1 upstream of the evaporator 10 is a blower 20, whose motor 20a is electrically connected to a manually operable airflow rate setting switch 21. The airflow rate setting switch 21 is of dial type and is manually selectable to an off mode (OFF), a moderately low mode (M1), a moderately high mode (M2), and a high mode (H). An operating rod 21a of the airflow rate setting switch 21 is disposed to disconnect the motor 20a from a power source or battery 40 (OFF mode), or connect the motor 20a with the power source 40 directly (H mode) or via resistances R1, R2, and R3 in series (L mode), or via resistances R2 and R3 (M1 mode), or via resistance R1 alone (M2 mode), thereby selecting the respective modes. The operating rod 21a has its end provided with a plurality of strip contacts 21b, via which it is connected with the control unit 18, so that the unit 18 is informed of the position selected by the switch 21. The operating rod 21a is electrically connected to the control unit 18 via a strip contact R5 and a main switch 22 of the air conditioning system. The control unit 18 is electrically connected to an accelerator switch 23. The accelerator switch 23 operates synchronously with an accelerator pedal 24, and is turned on when the accelerator pedal 24 is stepped on to the maximum degree, that is, when the engine operates in high-speed/high-load condition as the vehicle is accelerated or ascends a slope, and is otherwise turned off. The heater core 11 is for heating air by the use of engine cooling water as the heat source, and is provided downstream of the evaporator 10. Arranged immediately upstream of the heater core 11 is an air mix damper 25, which is disposed to adjust the degree of heating air cooled by the evaporator 10 by varying the distributing of the cooled air into a side conduit 1a and the heater core 11.

The control unit 18 controls the operation of the compressor in response to the positions assumed by the airflow rate setting switch 21 and the accelerator switch 23, as shown in Table 1 below.

TABLE 1

| Accelerator Switch | Airflow Rate Setting Switch | | | |
|---|---|---|---|---|
| | OFF | L M1 | M2 | H |
| ON (Accelerating/ Ascending) | Stop Compressor | Stop Compressor | | Make Setting Temperature High (Compressor Operation Rate Low) |
| OFF (Normal/ Decelerating) | Stop Compressor | Make Setting Temperature High (Compressor Operation Rate Low) | | Make Setting Temperature Low (Compressor Operation Rate High) |

The operation of the air conditioning system for automotive vehicles according to the invention constructed as above will now be described. While the vehicle is accelerating or ascending a slope, i.e., while the accelerator switch 23 is in on state, if the airflow rate setting switch 21 is turned to any one of the off (OFF) position, the low (L) position or the moderately low (M1) position, the control unit 18 acts to cause the electromagnetic clutch 19 of the compressor 13 to be disengaged to stop the operation of the compressor, and if the airflow rate setting switch 21 is turned to either the moderately high (M2) position or the high (H) position, the control unit 18 sets the setting temperature above which the compressor 13 is to operate to a higher value, thereby lowering the operation rate of the compressor 13. Therefore, the greater part of engine output is applied to acceleration and ascending of the vehicle, thereby eliminating output insufficiency and improving driveability.

Also, while the vehicle is cruising or decelerating, that is, while the accelerator switch 23 is in state, if the airflow rate setting switch 21 is turned off, the compressor 13 is stopped, and if the airflow rate setting switch 21 is turned to either the low (L) position or the moderately low (M1) position, the setting temperature is also set to the higher value to thereby lower the operation rate of the compressor 13, and further if the airflow rate setting switch 21 is turned to either the moderately high(M2) position or the high (H) position, the setting temperature is set to a lower value to thereby increase the operation rate of the compressor 13. In this way, the compressor 13 is operated at an operation rate commensurate with a required air cooling capacity.

Figure 2:
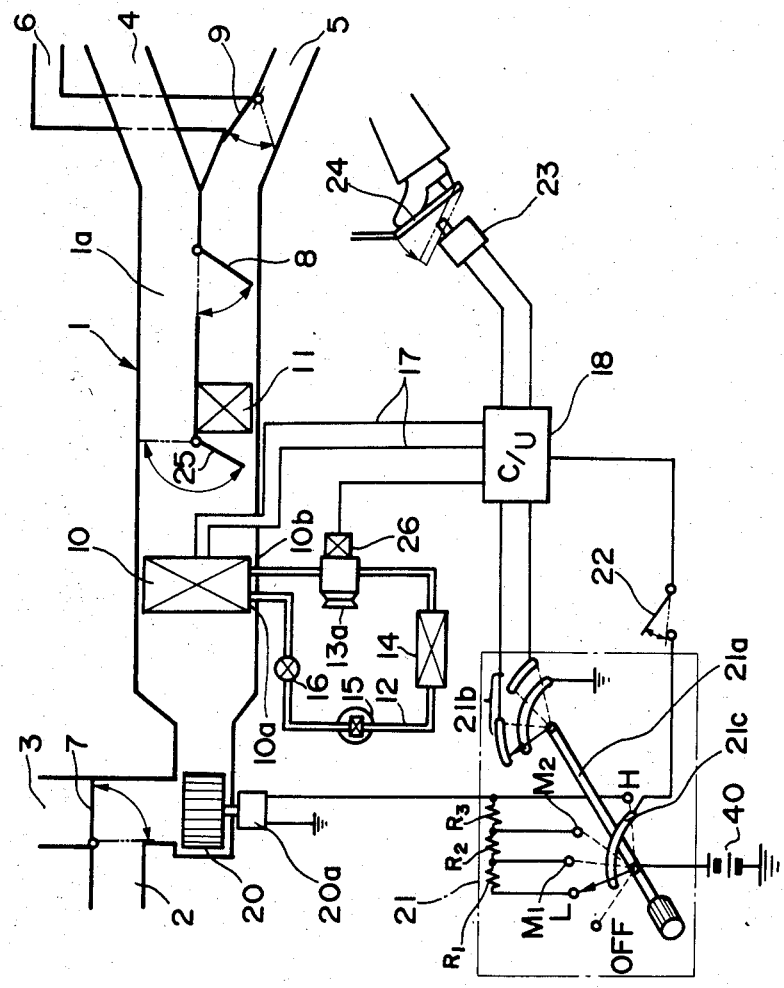
FIG. 2 is a schematic view similar to FIG. 1, illustrating a second embodiment of the invention.

FIG. 2 shows a second embodiment of the invention, which differs from the first embodiment in that a compressor 13a of variable capacity type is employed to vary the displacement of the compressor 13a in response to positions of the flowrate setting switch 21 and/or the accelerator switch 23. In FIG. 2, elements corresponding to those in FIG. 1 are designated by identical reference characters. In the second embodiment an electromagnetic valve 26 is provided for the compressor 13a which may advantageously be a wobble plate type, in lieu of the electromagnetic clutch 19. By opening and closing the electromagnetic valve 26 the internal pressure of the crankcase (not shown) in the compressor 13a is varied to thereby vary the inclination of the wobble plate (not shown) and hence the discharge capacity. The electromagnetic valve 26 is opened or closed in response to a control signal from the control unit 18. The wobble plate compressor 13a may be one as disclosed by U.S. Pat. No. 3,861,825, for instance, which is arranged such that the electromagnetic valve 26 is disposed to selectively connect or disconnect the interior of the crankcase with or from a suction space such as a suction pressure chamber in the compressor (not shown).

In this embodiment the control unit 18 controls the operation of the compressor in the following manner.

TABLE 2

| Accelerator Switch | Airflow Rate Setting Switch | | | |
|---|---|---|---|---|
| | OFF | L  M1 | M2 | H |
| ON (Accelerating/ Ascending) | Set Discharge Capacity to Zero | Set Discharge Capacity to Zero | Set Discharge Capacity to 50% | |
| OFF (Normal/ Decelerating) | Set Discharge Capacity to Zero | Set Discharge Capacity to 50% | Set Discharge Capacity to 100% | |

The operation of the second embodiment will now be described below.

When the accelerator switch 23 is on, if the airflow rate setting switch 21 is turned to any one of the positions of off (OFF), low (L), or moderately low (M1), the electromagnetic valve 26, connecting the crankcase with the suction space, is kept open so that the discharge capacity of the compressor 13a becomes zero, and if the airflow rate setting switch 21 is turned to either the moderately high (M2) or the high (H) position, the electromagnetic valve 26 has its opening duty ratio so controlled that the discharge capacity of the compressor 13a becomes 50% of the maximum capacity.

Also, when the accelerator switch 23 is off, if the airflow setting switch 21 is turned to the off (OFF) position, the electromagnetic valve 26 is kept open so that the discharge capacity of the compressor 13a becomes zero, and if the airflow rate switch 21 is turned to either the low (L) or the moderately low (M1) position, the electromagnetic valve 26 has its opening duty ratio so controlled that the discharge capacity of the compressor 13a becomes 50% of the maximum capacity, and further if the airflow rate setting switch is turned to either the moderately high (M2) or the high (H) position, the electromagnetic valve 26 is kept fully closed so that the discharge capacity of the compressor 13a becomes 100%, i.e., the maximum capacity.

Figure 3:
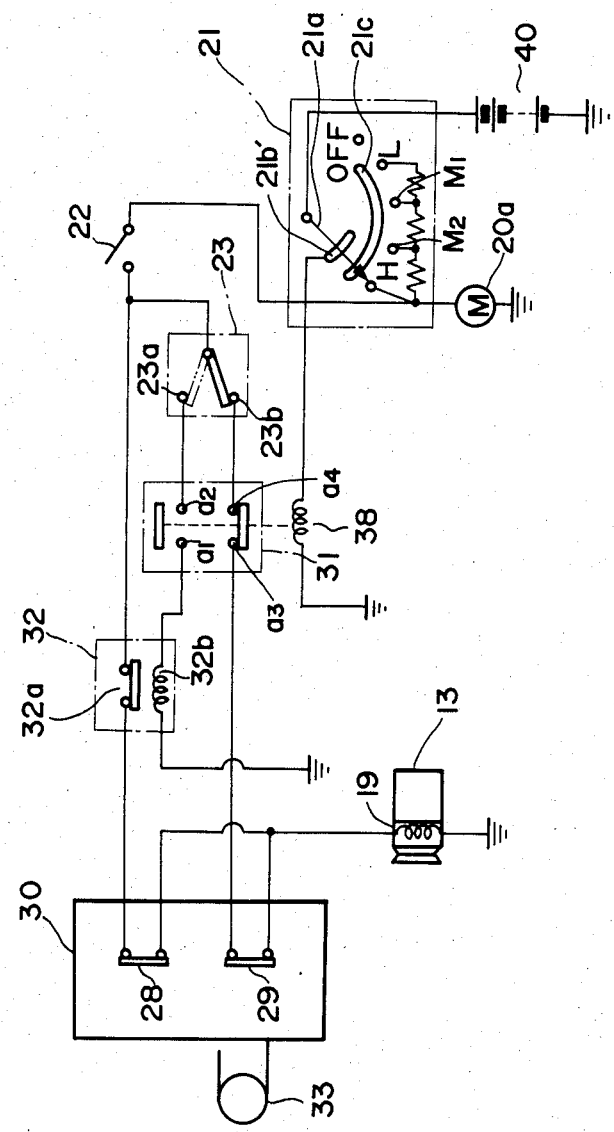
FIG. 3 is a schematic view of essential part of a third embodiment of the invention.

FIG. 3 shows a third embodiment of the invention, wherein a thermostat 30 is employed to control the operation of the compressor 13 in place of the control unit 18 employed in the first and second embodiments. The third embodiment is applicable to the basic arrangement of the air conditioning system of FIG. 1. In FIG. 3, elements corresponding to those in FIG. 1 are designated by identical reference characters.

The thermostat 30 comprises a temperature sensing probe 33 provided at the discharge air outlet of an evaporator (not shown), a first contacts 28 disposed to close at a predetermined higher temperature, and a second contacts 29 disposed to close at a predetermined lower temperature lower than that for the first contacts 28, the first and second contacts 28, 29 being connected, on one hand, to a temperature sensing probe 33 and to the solenoid of the electromagnetic clutch 19 of the compressor 13 at the other. The first contacts 28 is connected to the main switch 22 via a contacts 32a of a normally closed type relay 32. The second contacts 29 and a coil 32b of the relay 32 are connected to the main switch 22 via an interlocking switch 31 and an accelerator switch 23. Provided for the interlocking switch 31 is a coil 38 for changing switch positions, which is connected to a strip contact 21b of the airflow rate setting switch 21. The main switch 22 is connected at the junction of the airflow rate setting switch 21 with the motor 20a of the blower 20. The conductor 21'b of the airflow rate setting switch 21 is disposed to engage the operating rod 21a when the switch 21 assumes the high (H) position or the moderately high (M2) position, and the conductor 21 when the switch 21 assumes any position except the OFF position, respectively.

Figure 4:
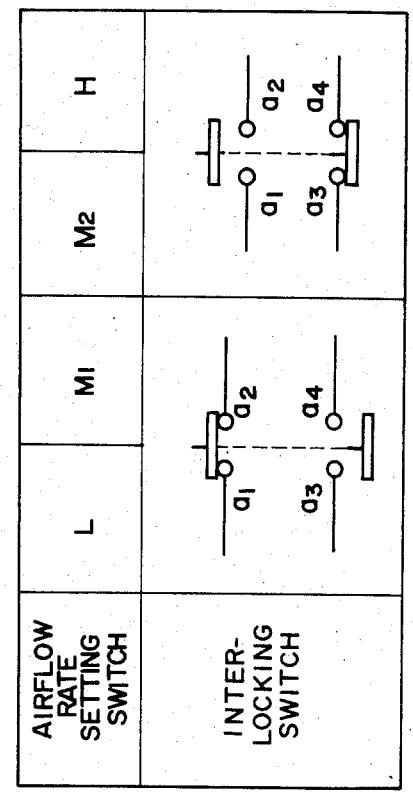
FIG. 4 shows the operational relationship between the airflow rate setting switch and the interlock switch, both appearing in FIG. 3.

The interlocking switch 31, which has two pairs of contacts a1 and a2, and a3 and a4, is turned in response to the position assumed by the airflow rate setting switch 21 as shown in FIG. 4. When the airflow rate setting switch 21 is turned to the low (L) position or the moderately low (M1) position, the coil 38 is deenergized to establish connection between the contact a1 connected to the coil 32b and the contact a2 connected to a contact of the accelerator switch 23, while disconnecting a contact a3 connected to the second contacts 29 of the thermostat 30 from a contact a4 connected to the other contact of the accelerator switch 23. On the other hand, if the airflow rate setting switch 21 is turned to either the moderately high (M2) position or the high (H) position, the coil 38 is energized to cause disconnection between the contacts a1 and a2, and connection between the contacts a3 and a4.

The compressor 13 is controlled in response to the respective positions of the airflow rate setting switch 21 and the accelerator switch 23 in a manner as shown in Table 3 below.

TABLE 3

| Accelerator Switch | Airflow Rate Setting Switch | | | |
|---|---|---|---|---|
| | OFF | L | M1 | M2    H |
| ON (Accelerating/ Ascending) | Stop Compressor | Stop Compressor | | Make Setting Temperature of Thermostat High (Compressor Operation Rate Low) |
| OFF (Normal/ Decelerating) | Stop Compressor | Make Setting Temperature of Thermostat High (Compressor Operation Rate Low) | | Make Setting Temperature of Thermostat Low (Compressor Operation Rate High) |

The operation of the third embodiment will now be described.

When the accelerator switch 23a is on as shown in the solid line in FIG. 3, if the airflow rate setting switch 21 is turned to the OFF position, the main switch 22 is disconnected from the power source 40 so that the compressor 13 stops operating. On this occasion, if the switch 21 is turned to either the low (L) position or the moderately low (M1) position, the coil 38 is deenergized and the contacts a1 and a2 of the interlocking switch 31 are connected with each other, whereupon the coil 32b of the relay 32 is energized to cause connection between the contacts a1 and a2, as shown in FIG. 4, so that the coil 32b of the relay 32 is energized to cause the contacts 32a to be opened, to thereby stop the compressor 13. Also, if the switch 21 is turned to either the moderately high (M2) or the high (H) position, the coil 38 is energized and the contacts a1 and a2 are disconnected from each other, whereupon the contacts 32a of the relay 32 is closed, to thereby cause connection between the compressor 13 and the power source 40 via the first contacts 28 of the thermostat 30. Then the setting temperature of the thermostat 30 is turned to the higher level, which causes the operation rate of the compressor 13 to be low.

Also, when the accelerator switch 23 assumes the OFF position, as shown by the solid line in FIG. 3, if the airflow rate setting switch 21 is turned to the off (OFF) position, the compressor 13, similarly as stated above, is disconnected from the power source to stop. Further, when the switch 21 is turned to either the low (L) or the moderately low (M1) position, the contacts a3 and a4 of the interlocking switch 31 are disconnected from each other (FIG. 4), as described above, whereby the relay 32 is interrupted from the power source 40 to thereby maintain the relay 32 in the closed state, which causes connection between the compressor 13 and the power source 40 by way of the first contacts 28 of the thermostat 30, whereby the setting temperature of the thermostat 30 is made high and thus the operation rate of the compressor 13 is reduced. On the other hand, if the airflow rate setting switch 21 is turned to the moderately high (M2) or the high (H) position, the contacts a3 and a4 are connected with each other to thereby cause connection between the compressor 13 and the power source 40 by way of the second contacts 29 of the thermostat 30 which gives rise to the lower setting temperature, whereupon the operation rate is increased.

Figure 5:
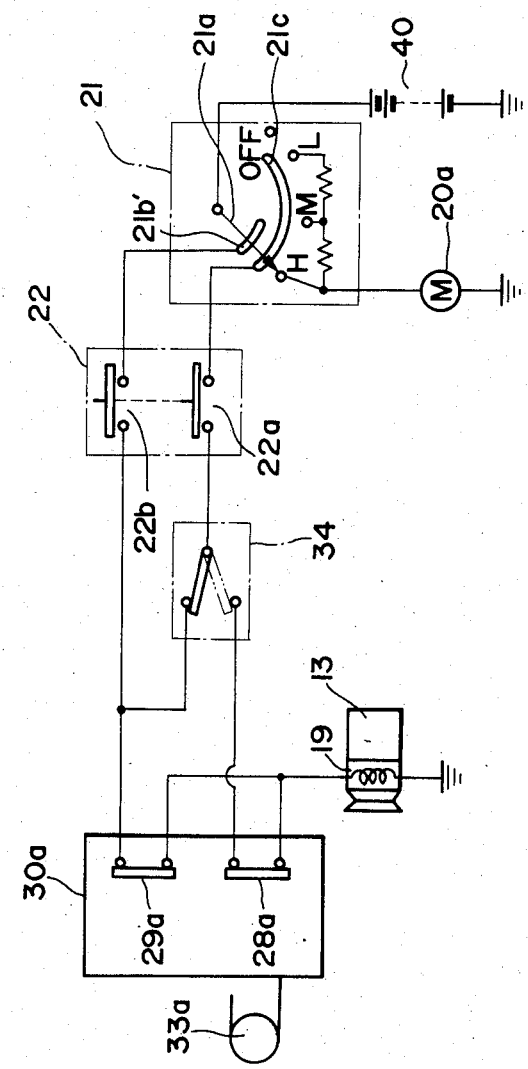
FIG. 5 is a schematic view similar to FIG. 3, illustrating a fourth embodiment of the invention.

FIG. 5 shows a fourth embodiment of the invention, wherein, similarly to the third embodiment shown in FIG. 3, the thermostat 30 is employed to control the operation of the compressor 13 in place of the control unit 18 shown in FIG. 1. The fourth embodiment is applicable to the basic arrangement of the air conditioning system of FIG. 1. In FIG. 5, elements corresponding to those in FIG. 1 are designated by identical reference characters.

This embodiment is distinguished from the embodiment shown in FIG. 3 in that an economy switch 34 is employed in place of the accelerator switch 23, the interlocking switch 31, and the relay 32.

A first contacts 28a of a thermostat 30a for the higher setting temperature is connected to the economy switch 34 and a terminal 21c of the airflow rate setting switch 21 via a contacts 22a of the main switch 22 of two-circuit type, whereas a second contacts 29a for the lower setting temperature is connected, on one hand, to a terminal 21b' of the airflow rate setting switch 21 via the other contacts 22b of the main switch 22 and, on the other hand, to the terminal 21c of the airflow rate setting switch 21 via the economy switch 34 and the contacts 22a. The terminal 21b' is disposed to engage the operating rod 21a only when the switch 21 assumes the high (H) position, and the terminal 21c is disposed to engage the operating rod 21a when the switch 21 assumes any position but OFF.

In response to the positions assumed by the economy switch 34 and the airflow rate setting switch 21, the operation of the compressor is controlled as shown in

TABLE 4

| Airflow Rate Setting Switch | Economy Switch | |
|---|---|---|
| | OFF (Normal Mode) | ON (Economy Mode) |
| H | Make Setting Temperature of Thermostat Low (Compressor Operation Rate High) | Make Setting Temperature of Thermostat Low (Compressor Operation Rate High) |
| M | Make Setting Temperature of Thermostat Low (Compressor Operation Rate High) | Make Setting Temperature of Thermostat High (Compressor Operation Rate Low) |
| L | | |

The operation of the fourth embodiment will now be described below.

When the economy switch 34 is in the normal mode position, as shown by the solid line in FIG. 5, if the airflow rate setting switch 21 is turned to either the high (H) position or the low (L) position, the compressor 13 is connected to the power source 40 via the second contacts 29a of the thermostat 30 for the lower setting temperature so that the operation rate of the compressor 13 becomes high.

On the other hand, when the economy switch 34 is in the economy mode position, as shown by the chain line in FIG. 5, if the airflow rate setting switch 21 is turned to the high (H) position, the compressor 13 is caused to connect to the power source 40 via the second contacts 29a for the lower setting temperature, the second contacts 22b of the main switch 22, and the terminal 21b' of the main switch 22, so that the air conditioning system is switched from the economy mode to the normal mode, that is, the setting temperature of the thermostat is made low and the compressor 13 is controlled to maintain high operation rate. On the other hand, if the airflow rate setting switch 21 is turned to either the middle (M) or the low (L) position, the operating rod 21a of the airflow rate setting switch 21 is disconnected from the terminal 21b', so that the setting temperature of the thermostat is made high and the operation rate of the compressor 13 is made low.

Figure 6:
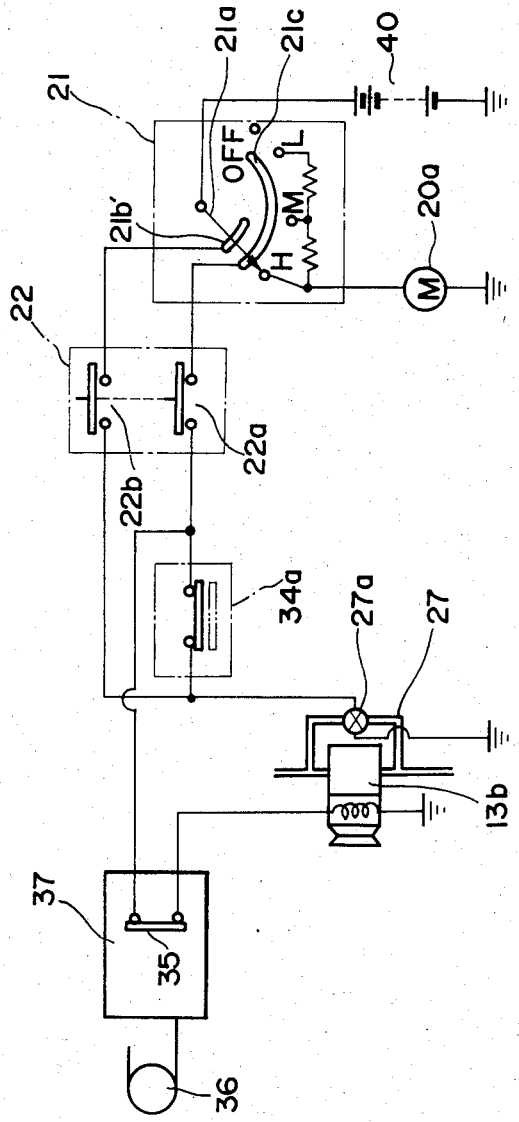
FIG. 6 is a schematic view similar to FIG. 3 illustrating a fifth embodiment of the invention.

FIG. 6 shows a fifth embodiment of the invention, which is distinguished from the fourth embodiment shown in FIG. 5, in that it is provided with a temperature sensing probe 36 of similar construction and arrangement as the temperature sensing probes 33 and 33a in FIGS. 3 and 5, respectively, a thermostat 37 having a single contacts 35, a variable delivery compressor 13b, and a two-terminal type economy switch 34a, and in that the economy switch 34a is directly connected to the compressor 13b. The variable delivery compressor 13b employed in this embodiment is of a type wherein a bypass conduit 27 is connected between the inlet port and the outlet port, and a normally-closed type electromagnetic flow-control valve 27a is provided across the bypass conduit 27.

The manner of controlling the operation of the compressor 13b of this embodiment is shown in Table 5 below:

TABLE 5

| Airflow Rate Setting Switch | Economy Switch | |
| --- | --- | --- |
| | OFF (Normal Mode) | ON (Economy Mode) |
| H | Set Discharge Capacity Great | Set Discharge Capacity Great |
| M | Set Discharge Capacity Great | Set Discharge Capacity Great |
| L | Set Discharge Capacity Great | Set Discharge Capacity Small |

The operation of the fifth embodiment will now be described below.

When the economy switch 34a is in the normal mode position, as shown by the solid line in FIG. 6, if the airflow rate setting switch 21 is turned to any one of the high (H) position, the middle (M) position, and the low (L) position, the solenoid of the electromagnetic valve 27a is energized with electricity supplied from the power source 40 through the switch 21, the contacts 22a of the main switch 22, and the economy switch 34, so that the electromagnetic valve 27a is closed to thereby cause the discharge capacity of the compressor 13b to be greater.

Also, when the economy switch 34a is in the economy mode position, as shown by the chain line in FIG. 6, if the airflow rate setting switch 21 is turned to the high (H) position, the solenoid of the electromagnetic valve 27a is energized with electricity supplied through the switch 21 and the contacts 22a of the main switch 22, so that the electromagnetic valve 27a is closed to thereby cause the discharge capacity of the compressor 13b to be greater. On the other hand, if the airflow rate setting switch 21 is turned to either the middle (M) or the low (L) position, the solenoid of the electromagnetic valve 27a, being electrically interrupted from the power source 40, is deenergized, so that the electromagnetic valve 27a is opened and the discharge capacity of the compressor 13b reduced.

What is claimed is:

1. An air conditioning system for an automotive vehicle having an engine installed thereon, comprising:
    a variable capacity type compressor driven by said engine;
    a blower;
    varying means for varying a discharge capacity of said compressor;
    airflow rate setting means including a manually operable airflow rate setting switch for manually selectively setting said blower at least to a first operating position for supplying air at a larger flow rate, and to a second operating position for supplying air at a smaller flow rate; and
    control means responsive to an operating position of said blower, set by said manually operable airflow rate setting switch, for controlling said varying means to thereby vary the discharge capacity of said variable capacity type compressor.

2. An air conditioning system as claimed in claim 1, wherein said control means is adapted to cause said varying means to set said discharge capacity to a larger value when said blower is in said first operating position, and to cause said varying means to set said discharge capacity to a smaller value when said blower is in said second operating position.

3. An air conditioning system as claimed in claim 1, including sensor means for sensing load conditions of said engine, and wherein said control means is responsive to output of said sensor means to cause said varying means to set said compressor discharge capacity to a smaller value when said engine is in a predetermined high load condition, and to cause said varying means to set said compressor discharge capacity to a larger value when said engine is in a condition other than said predetermined high load condition.

4. An air conditioning system as claimed in claim 2, including sensor means for sensing load conditions of said engine, and wherein said control means is responsive to output of said sensor means to cause said varying means to set said compressor discharge capacity to a smaller value when said engine is in a predetermined high load condition, and to cause said varying means to set said compressor discharge capacity to a larger value when said engine is in a condition other than said predetermined high load condition.

* * * * *